June 22, 1943.　　　J. W. GREIG　　　2,322,630
MOTOR VEHICLE CONSTRUCTION
Filed Feb. 12, 1940　　　4 Sheets-Sheet 1
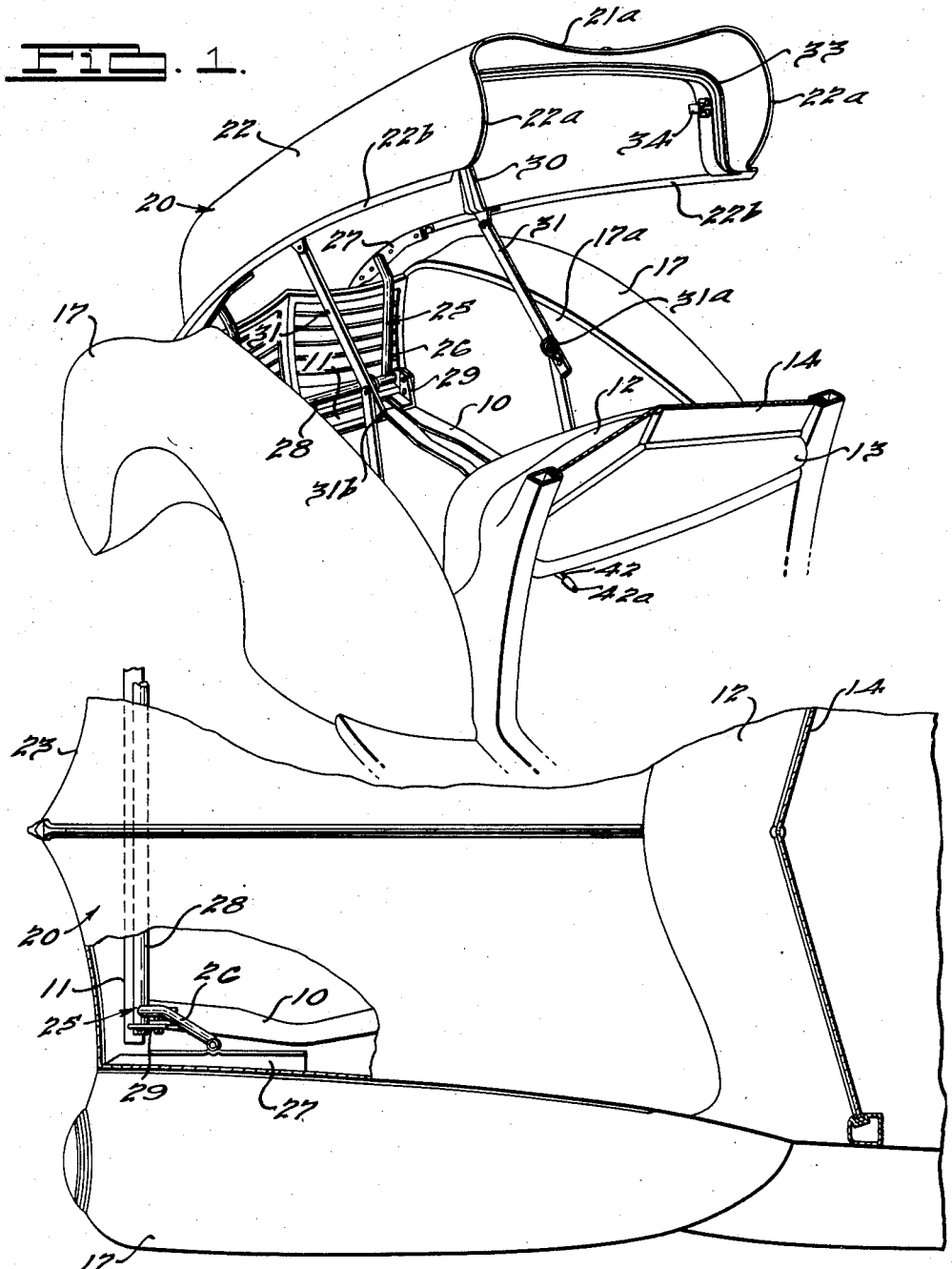
INVENTOR
James W. Greig.
BY Dike, Calver & Gray
ATTORNEYS.

June 22, 1943.   J. W. GREIG   2,322,630
MOTOR VEHICLE CONSTRUCTION
Filed Feb. 12, 1940   4 Sheets-Sheet 2
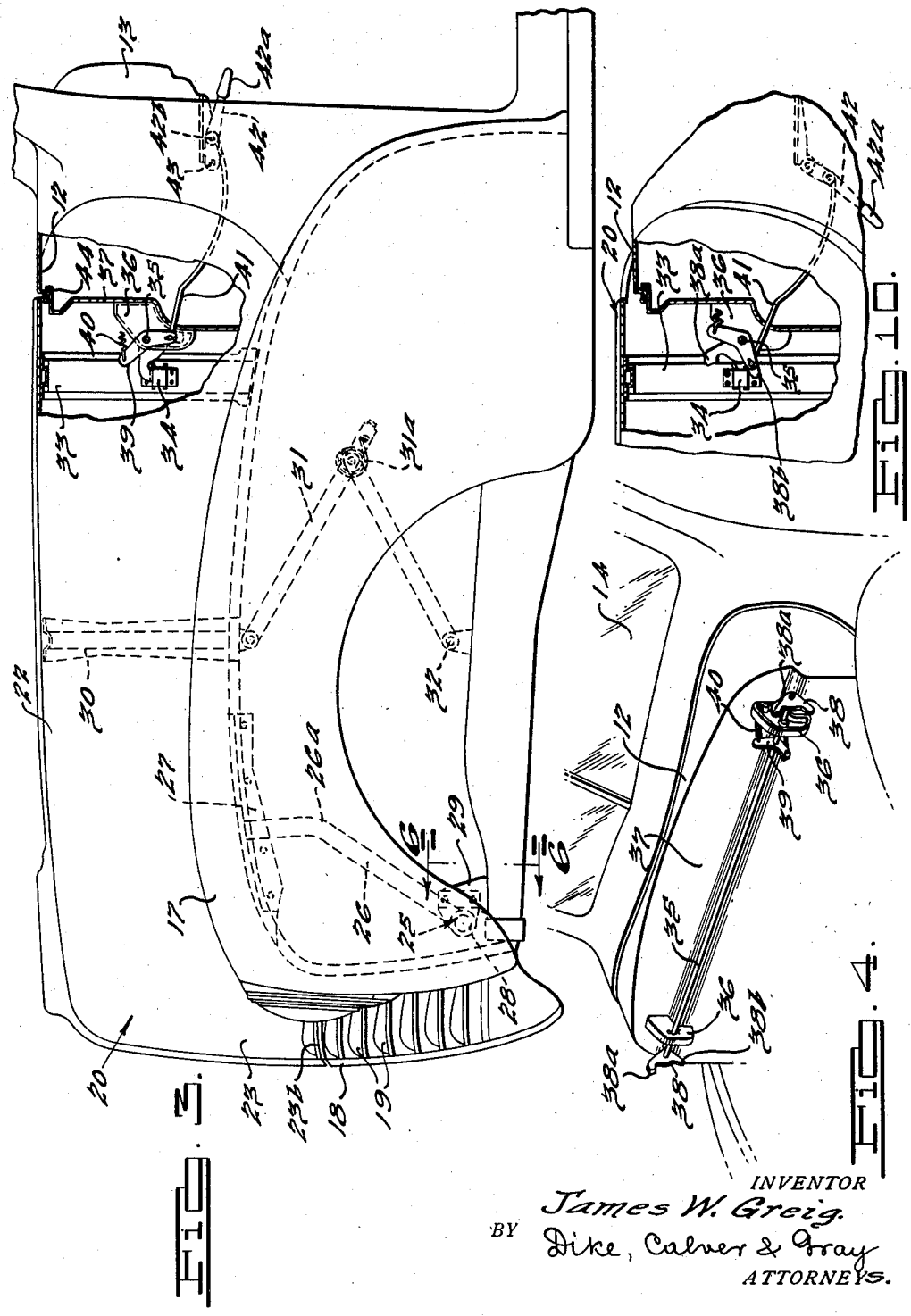
INVENTOR
*James W. Greig.*
BY *Dike, Calver & Gray*
ATTORNEYS.

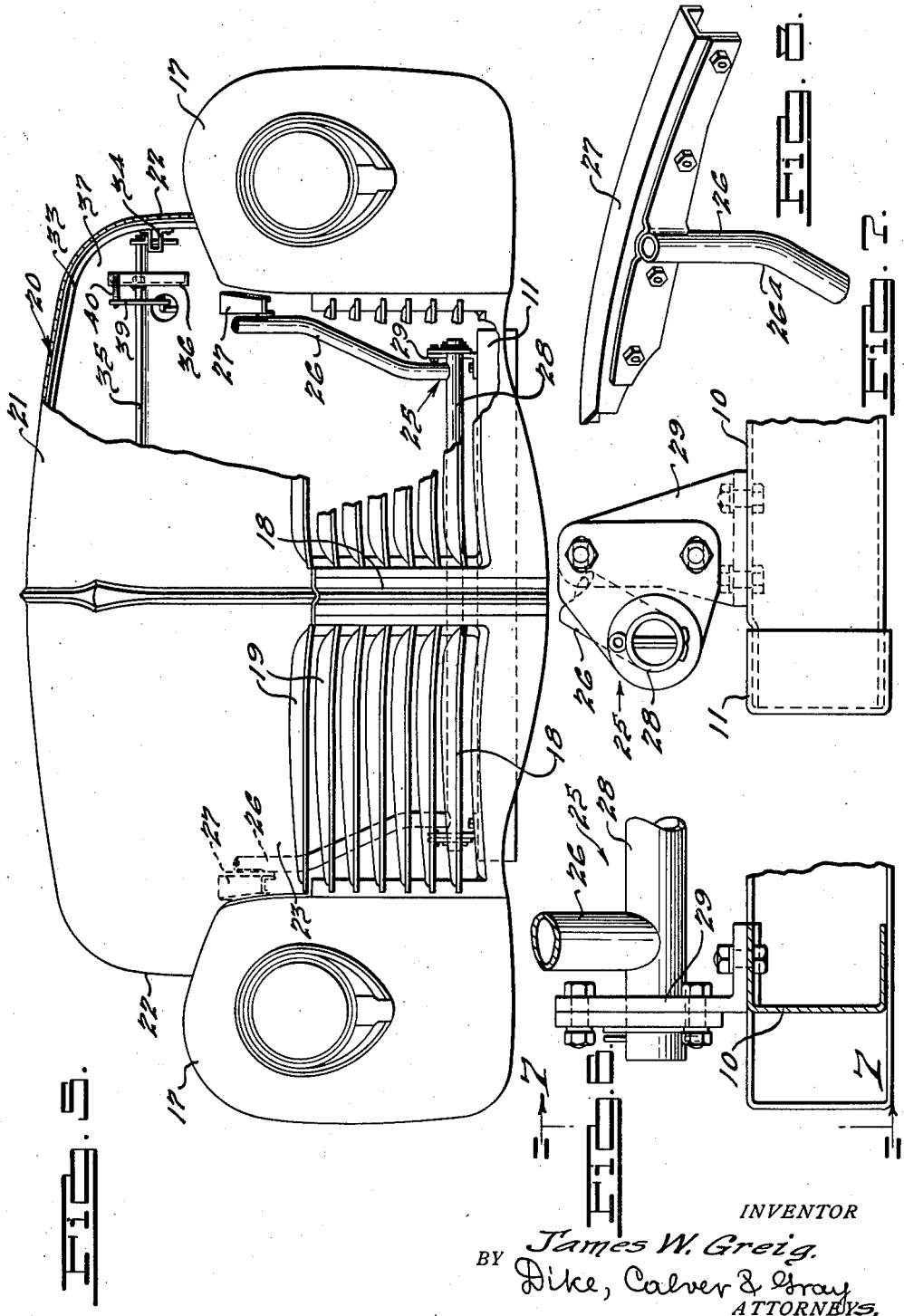

June 22, 1943.  J. W. GREIG  2,322,630
MOTOR VEHICLE CONSTRUCTION
Filed Feb. 12, 1940  4 Sheets-Sheet 4
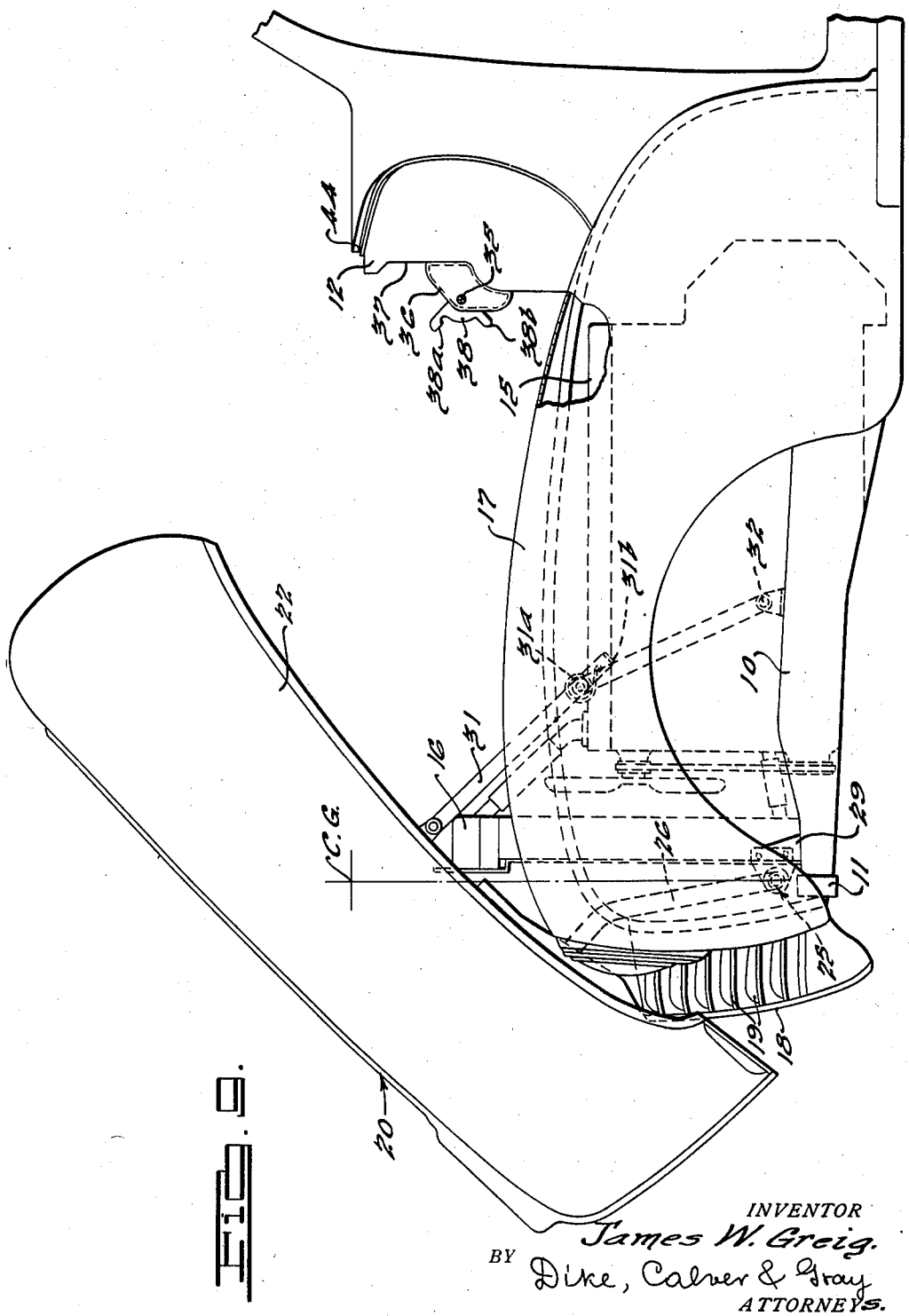
INVENTOR
*James W. Greig.*
BY *Dike, Calver & Gray*
ATTORNEYS.

Patented June 22, 1943

2,322,630

UNITED STATES PATENT OFFICE 2,322,630

MOTOR VEHICLE CONSTRUCTION

James W. Greig, Grosse Pointe Park, Mich., assignor to Hudson Motor Car Company, Detroit, Mich., a corporation of Michigan Application February 12, 1940, Serial No. 318,395

25 Claims. (Cl. 180—69)

This invention relates to motor vehicle constructions and more particularly to improvements in the hood or motor bonnet structures therefor.

One of the objects of the present invention is to provide an improved motor vehicle hood construction which is supported directly by the frame of the vehicle and in which squeaks and rattles frequently occurring in the hoods supported by the radiator and fender structures are largely eliminated.

Another object of the present invention is to provide an improved motor vehicle front end construction in which the hood or bonnet is hinged substantially by its front end directly on the frame of the vehicle, the hinge means being of such a character as to make the hood rigid transversely thus preventing wobbling or weaving of the hood from side to side in the process of closing or opening the same.

A further object of the invention is to provide an improved front end construction for an automobile in which the bonnet or hood is a unitary member having top and depending side walls embracing the engine compartment and having its forward end in the form of a nose extending downwardly in advance of the radiator core and merging into a fixed apron portion therebelow which may be provided with openings for the passage of air to the radiator.

Another object of the invention is to provide a motor vehicle hood construction of the foregoing kind in which the bonnet or hood is hinged adjacent its front end to permit the rear end to be raised and lowered for access to the front compartment.

Still another object is to provide a hood construction of the above kind in which the front depending nose of the bonnet merges inconspicuously into the lines of the front apron yet the bonnet is supported independently of the apron and is capable of being raised and lowered at all times free of the apron.

A further object of the invention is to provide a front end construction for an automobile in which the hood, which is substantially U-shaped in transverse section and pressed from sheet metal, is adapted to be raised and lowered as a unit through the medium of hinge means adjacent the forward end of the hood, the improved construction being such that the hood or bonnet member is rigid in a transverse direction and is so mounted that it may be raised easily with a minimum of effort.

Still a further object is to provide a hood construction in which the bonnet is hinged at its forward end and in which improved locking means are provided for drawing down and effectively locking the rear end of the bonnet, preferably through the medium of mechanism controlled from the driver's seat.

A further object of the invention is to provide an improved hood or bonnet for a motor vehicle, which hood is made of relatively thin sheet metal, such as is commonly used for hoods, and which, in spite of its lightness, is very strong, rigid and does not bend or wobble in operation.

Other objects and advantages of this invention will appear in the following description and appended claims, reference being had to the accompanying drawings forming a part of this specification wherein like reference characters designate corresponding parts in the several views.

Fig. 1 is a perspective view showing the front portion of a motor vehicle embodying the present invention, the hood being shown in its raised or open position.

Fig. 2 is a fragmentary tp view of the structure shown in Fig. 1, the hood being shown in its lowered or closed position.

Fig. 3 is a side view of the structure shown in Fig. 1, the hood being shown in its down or closed position and portions of the structure being broken away to show the locking means.

Fig. 4 is a perspective view of the cowl and dash, showing the locking means.

Fig. 5 is a front view with portions broken away of the structure shown in Fig. 1.

Fig. 6 is a fragmentary sectional view taken in the direction of the arrows on the section plane passing through the line 6—6 of Fig. 3.

Fig. 7 is a fragmentary side view taken from the line 7—7 of Fig. 6 in the direction of the arrows.

Fig. 8 is a perspective view illustrating the connection between the side walls of the hood and the hinge bars.

Fig. 9 is a view substantially similar to Fig. 3, the hood being shown in its raised or open position.

Fig. 10 is a fragmentary sectional view showing the operation of the locking means in raising the rear end of the hood.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a motor vehicle embodying the present invention. The motor vehicle hereinafter described is of the type in which the engine is mounted at the front of the vehicle. However, it will be understood that my invention is equally applicable to motor vehicles having engines mounted at the rear ends thereof.

Referring to the drawings and particularly to Fig. 1 thereof, there is illustrated the front portion of a motor vehicle comprising a frame including side members 10 and a plurality of transversely extending members, the front transverse frame member being shown and indicated by the numeral 11. On the frame there is operatively mounted a body of any desired type. In the construction shown the body includes a cowl portion 12, an instrument panel 13, and a windshield 14. On the frame there are also operatively mounted an engine 15 and a radiator 16 which may be of the conventional type comprising a vertical core supported upon the forward end of the frame.

The engine compartment intended for housing said engine and radiator is formed by the cowl portion 12 of the body and also by fenders 17 operatively mounted in any desirable way on the side frame members 10, said fenders being provided with vertically extending walls or panels 17a forming the lower side walls of said engine compartment. The walls 17a may be formed integrally with the fenders 17 or may be made as separate panels and connected to the fenders. The front wall of the engine compartment is formed by a fixed apron or radiator grille 18 having in the present instance ornamental louvers 19. By virtue of such a construction an engine compartment enclosed at its four sides and open at the top is formed. It will be noted from an examination of the drawings and particularly Figs. 1, 3 and 9 thereof that the height of the engine compartment is determined by the height of the cowl portion 12, and that the walls 17a and the radiator apron or grille 18 extend, in the present embodiment, upwardly substantially to about one-half of the total height of the engine compartment. The upper parts of the side walls and the front wall of the engine compartment are formed by the side and front walls of the bonnet or hood 20 operatively mounted to close and to open said engine compartment.

The hood 20 is in the form of a cover comprising a top portion 21 having downwardly extending side walls 22, the top and side walls merging at the front end into a nose providing a downwardly extending front wall 23. The rear edge 21a of the top 21 and edges 22a of the side walls 22 are substantially straight and bear in the closed position of the hood upon the cowl portion 12. The lower edges 22b of the side walls 22 come in proximity to the top edges of the walls 17a, while the lower edge 23b of the front wall comes in close proximity to the top edge of the radiator apron grille 18. Thus in the lowered or closed position of the hood 20 the engine compartment is covered from its top with the aid of the hood 20 which forms the upper portions of the front and side walls as well as the top of said engine compartment. One or more of the ornamental louvers 19 may be provided on the lower portion of the front wall 23 in order to conceal the line of separation.

An important feature of the present invention is the mounting of the bonnet or hood 20 directly on the frame of the vehicle. As can be clearly seen from an examination of the drawings, the hinge means connecting the hood 20 to the frame include a U-shaped member generally indicated by the numeral 25. Said member comprises legs 26 having upper ends secured to the brackets 27 fastened to the lower edges 22b of the side walls 22. The lower ends of the legs 26 are connected together by means of a transverse bar 28. The ends of the bar 28 extend outwardly and pivot in angle brackets 29 secured to the side frame members 10. The brackets 29 are secured substantially to the extremities of the frame members 10, while the brackets 27 are secured to the hood 20 at a predetermined distance from the front extremity thereof. The legs 26 are bent as indicated at 26a, and in the closed position of the hood 20 they extend upwardly and rearwardly of the brackets 29. By virtue of such a construction, opening of the hood 20 produces during the first portion of the opening movement a considerable upward component which enables clearing of the upper edge of the apron or grille 18. In addition, the fastening of the upper ends of the legs 26 permits full opening of the hood 20 without prematurely striking the top edge of the apron or grille 18.

To the lower surface of the hood 20 and substantially in the middle thereof there is secured an arched or U-shape stiffening member or rib 30 preferably of a channel cross section, extending transversely of the hood 20. To the ends of said member 30 there are secured the upper ends of check arms 31, the lower ends of the arms being hingedly secured to the frame members 10 through the medium of brackets as indicated at 32. The check arms 31 may be of any suitable construction and are preferably self-locking. In the present instant they are of the toggle type having a spirally wound counterbalancing spring 31a at the joint of the arms. the ends of the spring being connected to the respective arms.

Resistance of the spring 31a is sufficient in the fully extended position of the check arm to support the hood in the raised position, since in such a position of the check arm the leverage of the arms is very small and considerable effort is required to launch the hood toward its closed position. In its raised position the check arms 31 prevent the hood by the resistance of their springs 31a from falling down, and from further opening by stops 31b provided on the arms. However, as soon as the hood 20 is launched toward its closed position, folding of the check arm operates to increase the leverage of the arms, making the resistance of the spring 31a as the hood moves toward its closed position less and less effective. It will be seen that in the raised position of the hood 20 the same is supported directly on the frame of the vehicle by the U-shaped hinge member 25 and the check arms 31, and no load whatsoever is carried by the fenders or the radiator or the radiator grille.

In the closed position of the hood 20 the same is supported by the frame and by the cowl portion 12 of the body. Again no load whatsoever is imposed on the fenders 17 or the radiator grille 18. The lower edges 22a of the side walls and 23a of the front wall of the hood 20 in the closed position thereof do not contact fenders or the radiator grille, and there is a predetermined clearance provided along the line of their separation. I prefer to use a clearance from one-eighth of an inch to three-sixteenths. Because of the rigidity of the hood 20 and the fact that hinge means thereof are interconnected and located far apart, the hood is capable of resisting considerable side pressure without deflection, and therefore in opening and closing it travels through a predetermined path and when closed comes into an exactly predetermined position without striking or contacting the edges of the fenders 17 or the radiator grille 18. By virtue of such a construction scratching of the fenders and objectionable squeaks and rattles are entirely eliminated without even the necessity of providing felt or rubber cushions or gaskets on the fenders or radiator grille.

The rigidity of the hood 20 is still further enhanced by the provision of the second stiffening member or rib 33 preferably of a channel construction, secured in proximity to the rear edge of the hood 20 and extending transversely of the hood. The member 33 in addition to performing its stiffening function also carries locking brackets 34 adapted to be engaged by the locking means mounted on the cowl portion 12 of the vehicle and controllable from the operator's seat.

The locking mechanism herein shown is generally similar with some modifications to the mechanism shown in my co-pending application Serial No. 214,072, filed June 16, 1938. In the construction herein shown the locking means comprise a cross shaft or rod 35 rotatably mounted adjacent its ends in brackets 36 secured in any suitable way to the dashboard or panel 37. At its ends the shaft 35 carries locking members 38 which may be in the form of bellcranks secured to the shaft 35 at their middle portions and having ends 38a and 38b. The shaft 35 is actuated with the aid of a crank 39 one end of which is secured to the bracket 36 through a spring 40 while the other end is connected to a resilient or spring drag or push and pull rod 41 hingedly secured at 42b to the lever 42, the latter having a handle 42a and hinged underneath the instrument panel as indicated at 43. The rod 41 is bowed in its length to provide resiliency so that when the bonnet is drawn down to closed position the rod 41 is sprung and stretched longitudinally and placed in tension.

When the hood 20 is lowered and the handle 42a moved up to the position indicated in Fig. 3, the locking members 38 engage with their ends 38a the locking brackets 34 secured to the member 33 pushing the same down and, consequently, drawing the rear edge of the hood 20 firmly against the soft strip 44 provided on the cowl portion 12, thus holding the hood 20 firmly to the cowl 12. It should be noted that when the bonnet is closed the handle 42a is raised sufficiently to cause the point 42b to be moved upwards passed a dead center line from the pivot 43 to the forward point of connection of rod 41 thus effectively locking the handle lever 42 against opening movement.

The above described means are also effective for raising the rear end of the hood 20 to permit getting a firm manual hold thereon from outside of the vehicle for opening the hood. As illustrated in Fig. 10, moving the handle 42a all the way forward causes the end 38b of the bellcrank 38 to contact the bracket 34 from underneath and to push the same upward, thus raising the rear end of the hood for a sufficient distance, preferably about one inch.

By virtue of such a construction there is provided an improved hood for the engine compartment of a motor vehicle, which preferably is entirely independent in its mounting from the radiator, fenders or the radiator grille. Preferably the hood is supported in its closed position on the frame and the cowl portion of the body without touching the fenders or the radiator or the radiator grille, and in its open position it is supported solely on the frame of the vehicle. Because of the provision of the above described hinge means and stiffening members, the hood is rigid in its construction and travels alone in a definite predetermined path without wobbling or swaying from side to side. The improved locking means permit easy and firm locking of the hood to the cowl portion from the operator's seat. Location of the hinge means is such that the hood opens with an upper component and moves as far forward clearing the radiator grille as is necessary for complete uncovering of the engine compartment.

I claim:

1. In a motor vehicle having a frame, an engine and a radiator mounted on said frame, fenders and a radiator grille forming an engine compartment open at its top, a bonnet adapted to cover said compartment from its top, and hinge means adapted to support said bonnet directly on said frame.

2. In a motor vehicle having a frame, an engine and a radiator mounted on said frame, fenders and a radiator grille forming an engine compartment open at its top, a bonnet adapted to cover said compartment from its top, and a hinge at the front of said bonnet adapted to support said bonnet directly on said frame.

3. In a motor vehicle having a frame, an engine and a radiator mounted on said frame, fenders and a radiator grille forming an engine compartment open at its top, and a bonnet adapted to cover said compartment from its top, a hinge at the front of each of the two sides of said bonnet, said hinges being adapted to support said bonnet directly on said frame.

4. In a motor vehicle having a frame, fenders and a radiator grille forming an engine compartment open at its top; a hood having downwardly extending front and side walls, and hinge means for said bonnet comprising a downwardly extending bar adjacent each of said side walls, said bars being hinged directly on said frame.

5. In a motor vehicle having a frame, fenders and a radiator grille forming an engine compartment open at its top; a hood having downwardly extending front and side walls, and hinge means for said bonnet comprising a downwardly extending bar adjacent each of said side walls, said bars being hinged directly on said frame, and a connection between said bars.

6. In a motor vehicle having a frame, fenders and a radiator grille forming an engine compartment open at its top; a hood having downwardly extending front and side walls, hinge means for said hood comprising a downwardly extending bar adjacent each of said side walls, said bars being hinged directly on said frame, and a transversely extending member connecting said bars to brace them laterally.

7. In a motor vehicle having a frame, fenders and a radiator grille forming an engine compartment open at its top; a hood having downwardly extending front and side walls, hinge means for said hood comprising a downwardly extending bar adjacent each of said side walls, said bars being hinged directly on said frame, and two check arms hinged respectively to said frame and to the structure of the side walls of said hood and adapted to support said hood in its raised position.

8. In a motor vehicle having a frame, fenders and a radiator grille forming an engine compartment open at its top; a hood having downwardly extending front and side walls, hinge means for said hood comprising a downwardly extending bar at each of said side walls, said bars being hinged directly on said frame, a stiffening rib secured to said hood transversely thereof substantially at its middle portion, and two check arms hinged respectively to said frame and to the extremities of said rib and adapted to support said hood in its raised position.

9. In a motor vehicle having a frame, a body mounted on said frame and having a cowl portion, two fenders and a radiator grille mounted on said frame, said cowl portion, fenders and grille forming an engine compartment open at its top; a hood having a front portion hingedly connected directly to said frame and adapted to cover and to open selectively said engine compartment, said hood also having a rear portion adapted to be supported in the closed position of the hood by said cowl portion.

10. In a motor vehicle having a frame, a body mounted on said frame and having a cowl portion, two fenders and a radiator grille mounted on said frame, said cowl portion, fenders and grille forming an engine compartment open at its top; a hood having downwardly extending front and side walls, hinge means provided substantially on the front portions of said side walls and adapted to connect hingedly said hood directly to said frame for moving said hood to open and to close said compartment, the rear edge of said hood being adapted to rest on the cowl portion when the hood is in its closed position.

11. In a motor vehicle having a frame, a body mounted on said frame and having a cowl portion, two fenders and a radiator grille mounted on said frame, said cowl portion, fenders and grille forming an engine compartment open at its top; a hood having downwardly extending front and side walls, hinge means provided substantially on the front portions of said side walls and adapted to connect hingedly said hood directly to said frame for moving said hood to open and to close said compartment, the rear edge of said hood being adapted to rest on the cowl portion when the hood is in its closed position, and locking means on the cowl operable from within the vehicle and adapted selectively to lock the rear portion of said hood to the cowl and to unlock the same.

12. In a motor vehicle having a frame, a body mounted on said frame and having a cowl portion, two fenders and a radiator grille mounted on said frame, said cowl portion, fenders and grille forming an engine compartment open at its top; a hood having downwardly extending front and side walls, hinge means provided substantially on the front portions of said side walls and adapted to connect hingedly said hood directly to said frame for moving said hood to open and to close the engine compartment, the rear edge of said hood being adapted to rest on the cowl portion when the hood is in its closed position, a stiffening rib extending transversely of said hood and secured substantially to the rear portion thereof, and locking means mounted on the cowl and adapted to engage said rib for locking the hood to said cowl.

13. In a motor vehicle having a frame, a body mounted on said frame and having a cowl portion, two fenders and a radiator grille mounted on said frame, said cowl portion, fenders and grille forming an engine compartment open at its top; a hood having downwardly extending front and side walls, hinge means provided substantially on the front portions of said side walls and adapted to connect hingedly said hood directly to said frame for moving the hood to open and to close the engine compartment, the rear edge of said hood being adapted to rest on the cowl portion when the hood is in its closed position, and two check arms hinged respectively to said frame and to the structure of said side walls and adapted to support the hood in the raised position thereof.

14. In a motor vehicle having a frame, a body mounted on said frame and having a cowl portion, two fenders and a radiator grille mounted on said frame, said cowl portion, fenders and grille forming an engine compartment open at its top; a hood having downwardly extending front and side walls, hinge means provided substantially on the front portions of said side walls and adapted to connect hingedly said hood directly to said frame for moving said hood to open and to close the engine compartment, the rear edge of the hood being adapted to rest on the cowl portion when the hood is in its closed position, a stiffening rib extending transversely of said hood and secured substantially to the middle portion thereof, and two check arms hinged respectively to said frame and to the extremities of said rib and adapted together with said hinge means to support the hood in the open position thereof.

15. In a motor vehicle having a frame, a body mounted on said frame and having a cowl portion, two fenders and a radiator grille mounted on said frame, said cowl portion, fenders and grille forming an engine compartment open at its top; a hood having downwardly extending front and side walls, hinge means provided substantially on the front portions of said side walls and adapted to connect hingedly said hood directly to said frame for moving the hood to open and to close the engine compartment, the rear edge of the hood being adapted to rest on said cowl portion when the hood is in its closed position, a stiffening rib extending transversely of said hood and secured substantially to the middle portion thereof, two check arms hinged respectively to said frame and to the extremities of said rib and adapted together with said hinge means to support the hood in the open position thereof, a second stiffening rib extending transversely of the hood and secured substantially to the rear portion thereof, and locking means mounted on said cowl and adapted to engage said second stiffening rib for locking the hood to said cowl.

16. In a motor vehicle having a frame, a body mounted on said frame and having a cowl portion, two fenders and a radiator grille mounted on said frame, said cowl portion, fenders and grille forming an engine compartment open at its top; a hood having downwardly extending front and side walls, hinge means provided substantially on the front portions of said side walls and adapted to connect hingedly said hood directly to said frame for moving the hood to open and to close the engine compartment, the rear edge of the hood being adapted to rest on the cowl portion when the hood is in its closed position, said hinge means and said cowl being adapted to support the hood in the closed position thereof at a predetermined clearance distance from the said fenders and grille.

17. In a motor vehicle having a frame, a body mounted on said frame and having a cowl, two fenders and a radiator grille mounted on said frame and forming an engine compartment open at its top, a bonnet having downwardly extending front and side walls, a U-shape bracket having legs secured to the structure of the side walls of said bonnet and its lower bar hinged on said frame, said bracket being adapted to support said bonnet in the closed position thereof at a predetermined clearance distance from said fenders and grille.

18. In a motor vehicle having a frame including side members, a body mounted on said frame and having a cowl, two fenders and a radiator grille mounted on said frame and forming an engine compartment open at its top, a bonnet having downwardly extending front and side walls, a U-shape bracket having legs secured to the structure of the side walls of said bonnet and its lower bar hinged on the side members of said frame, said bracket being adapted to support said bonnet in the closed position thereof at a predetermined clearance distance from said fenders and grille, and to prevent side-rocking of the bonnet.

19. In a motor vehicle having a frame, a body mounted on said frame and having a cowl portion, two fenders and a radiator grille mounted on said frame, said cowl portion, fenders and grille forming an engine compartment open at its top; a hood having downwardly extending front and side walls, hinge means provided substantially on the front portions of said side walls and adapted to connect hingedly said hood directly to said frame for moving said hood to open and to close said compartment, the rear edge of said hood being adapted to rest on the cowl portion when the hood is in its closed position, and locking means on the cowl operable from within the vehicle and adapted selectively to lock the rear portion of said hood to the cowl and to unlock the same and also adapted to forcibly separate said hood from the cowl portion upon release operation of said locking means.

20. In a motor vehicle having a frame and a compartment at one end of the vehicle having sides and open at its top, a bonnet adapted to cover the top of said compartment and adapted to be swung into positions to open and close said compartment, and hinge means at one end of said bonnet adapted to support said bonnet directly on the frame, said bonnet being free of supporting contact with the compartment sides when in closed position.

21. In a motor vehicle having a frame and a compartment at one end of the vehicle open at its top, a bonnet adapted to cover the top of said compartment and adapted to be swung into positions to open and close said compartment, and hinge means at one end of said bonnet within said compartment and adapted to support said bonnet directly on the frame.

22. In a motor vehicle having a frame and an engine compartment open at its top, a bonnet adapted to cover said compartment from its top, and hinge means within the compartment adapted to support said bonnet directly on said frame.

23. In a motor vehicle having a frame and a compartment at the front end of the vehicle having sides and open at its top, a swinging bonnet forming a closure for the top of said compartment and adapted to be swung into positions to open and close said compartment, said bonnet comprising a top and depending side portions, hinge means for attaching one end of the bonnet to the frame and adapted to support the bonnet directly on the frame with said bonnet side portions free of supporting contact with the compartment sides in the closed position of the bonnet.

24. In a motor vehicle having a frame and a compartment at the front end of the vehicle open at its top, a swinging bonnet forming a closure for the top of said compartment and adapted to be swung into positions to open and close said compartment, said bonnet comprising a top and depending side portions, hinge means for attaching the front end of the bonnet to the frame and adapted to support the bonnet directly on the frame with said bonnet side portions free of supporting contact with the frame in the closed position of the bonnet.

25. In a motor vehicle having a frame and an engine compartment open at its top, a bonnet adapted to cover said compartment from its top, a hinge at one end of said bonnet at each of the two sides thereof, said hinges being within the compartment and adapted to support said bonnet directly on said frame.

JAMES W. GREIG.